Nov. 13, 1928.
G. KRASNOSKY
WOODWORKING APPARATUS
Filed July 16, 1927
1,691,850
5 Sheets-Sheet 1
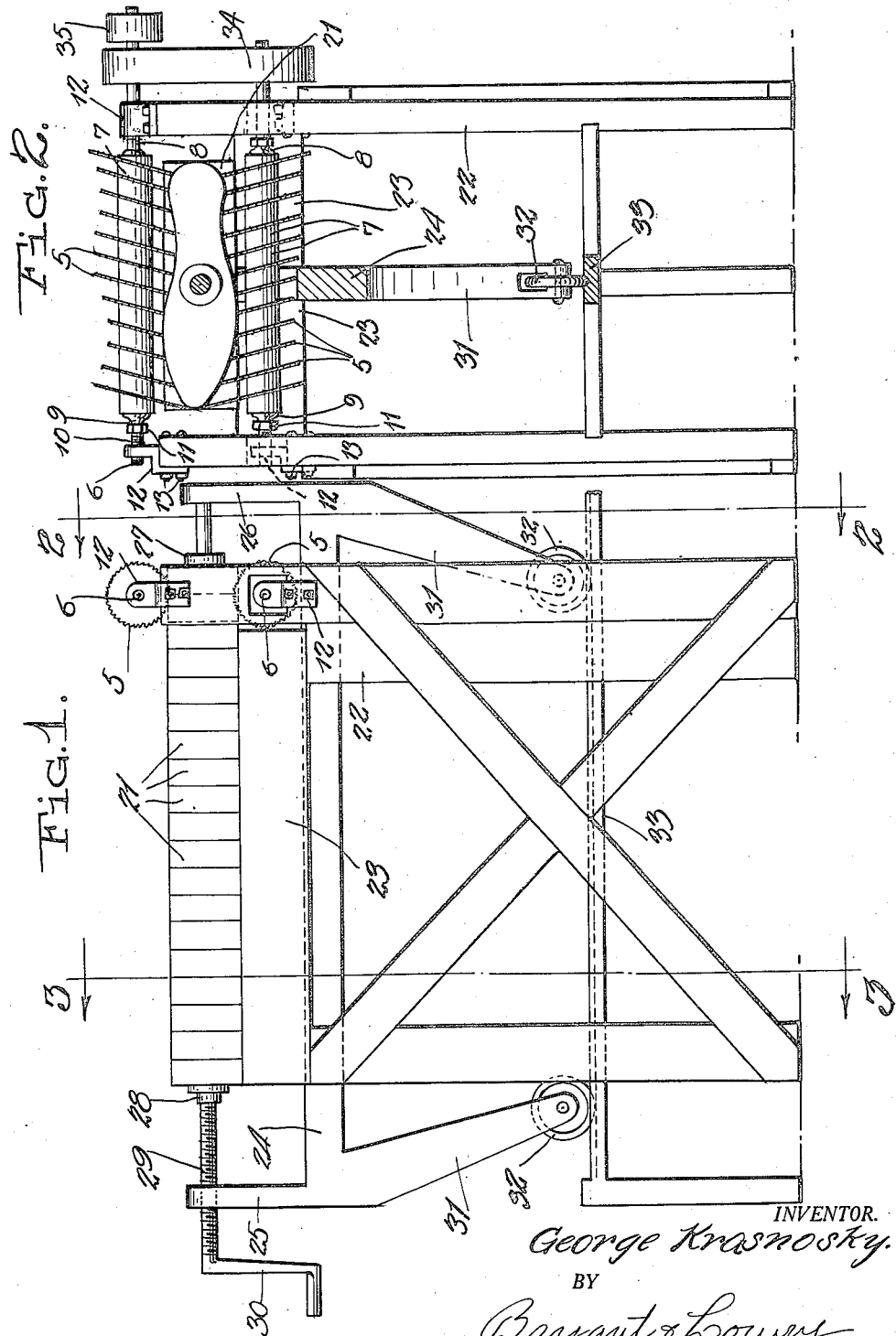
INVENTOR.
George Krasnosky.
BY
Bryant & Lowry
ATTORNEYS

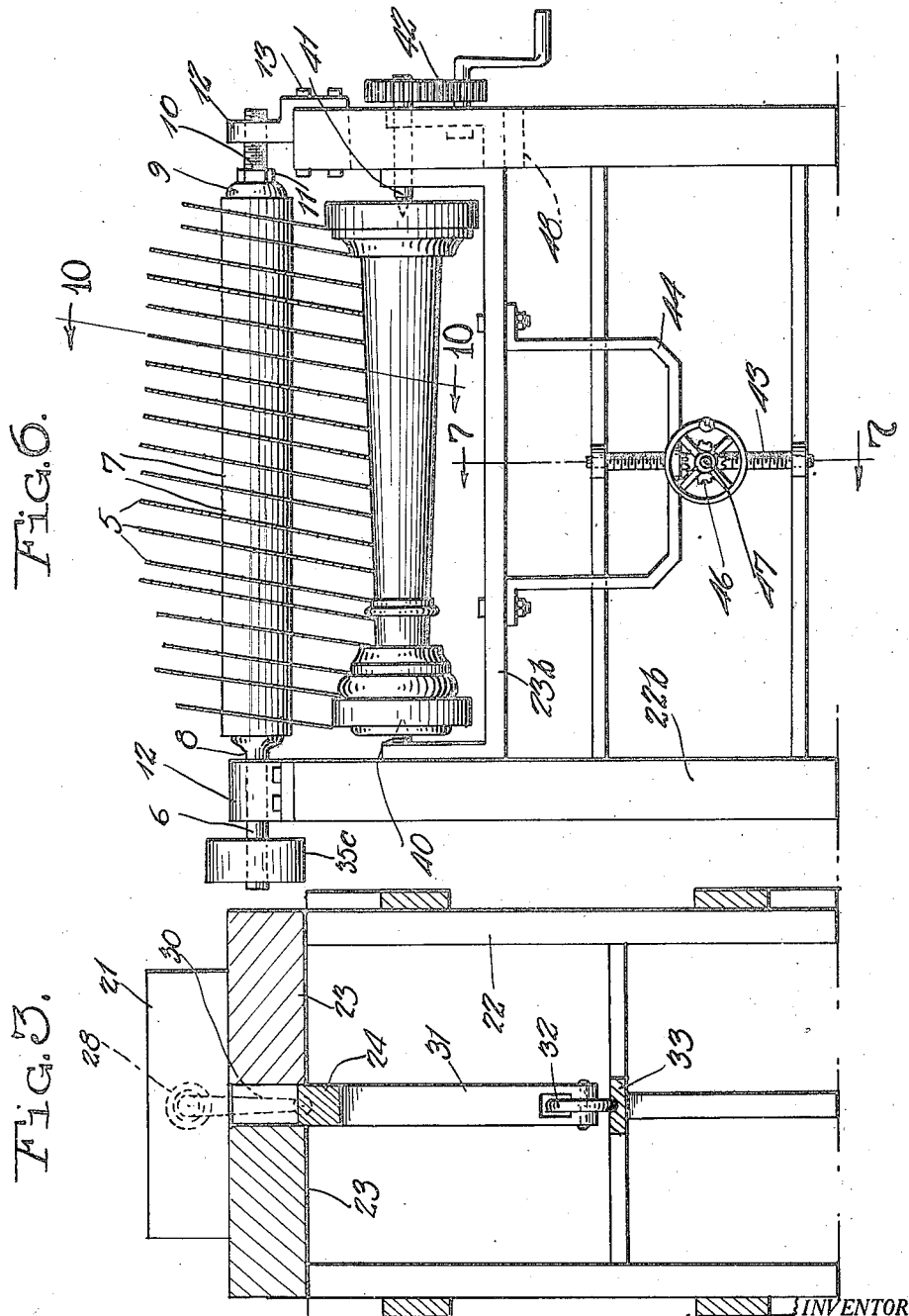

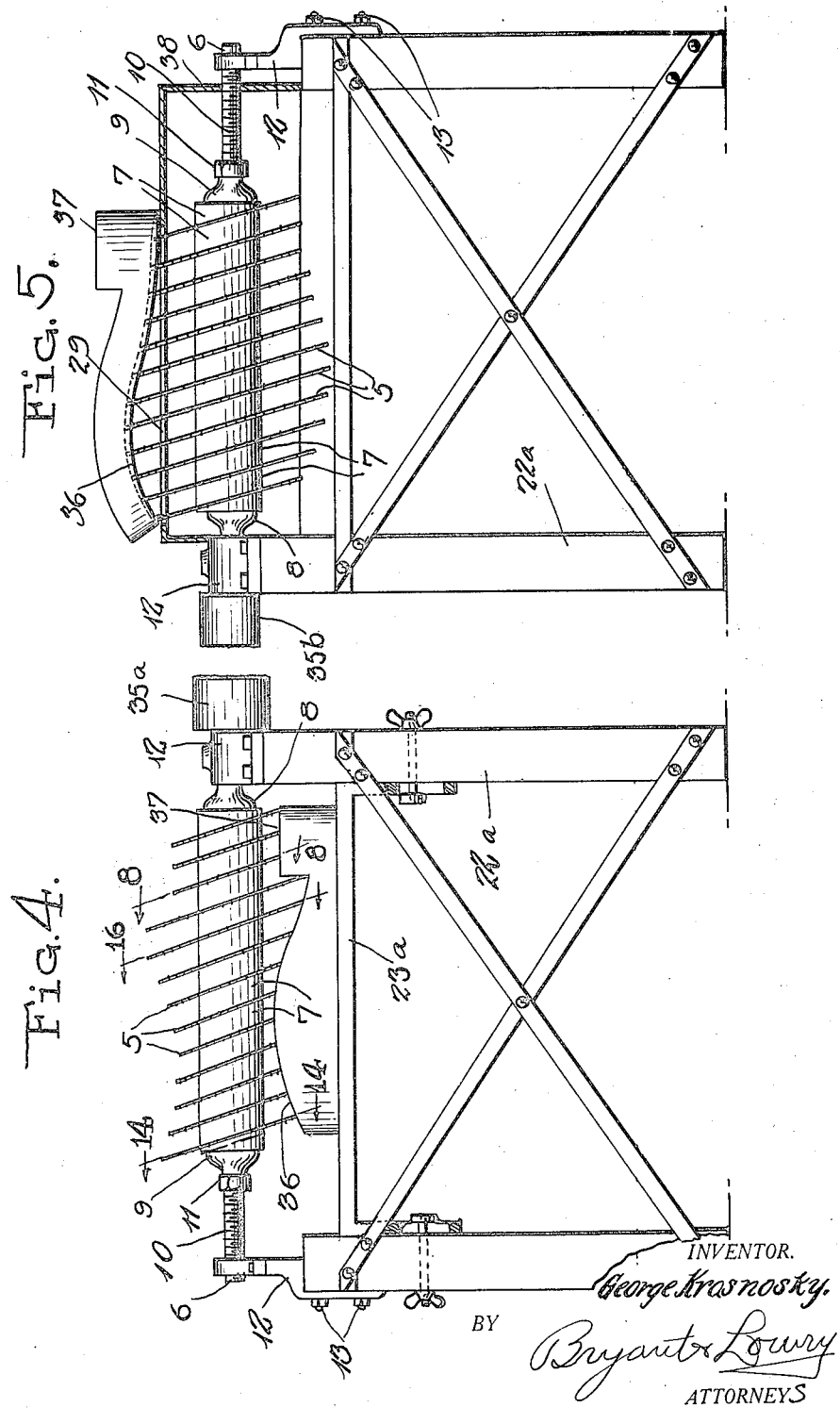

Nov. 13, 1928.
G. KRASNOSKY
WOODWORKING APPARATUS
Filed July 16, 1927    5 Sheets-Sheet 4
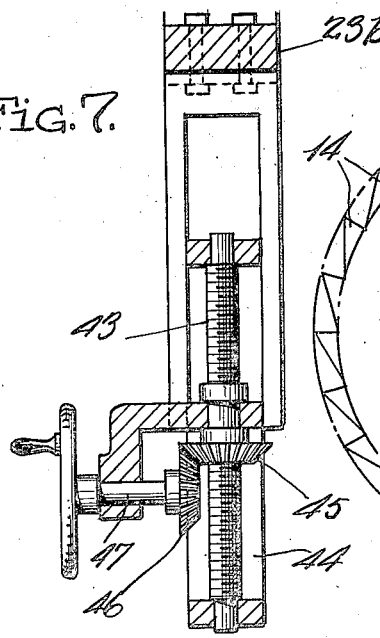
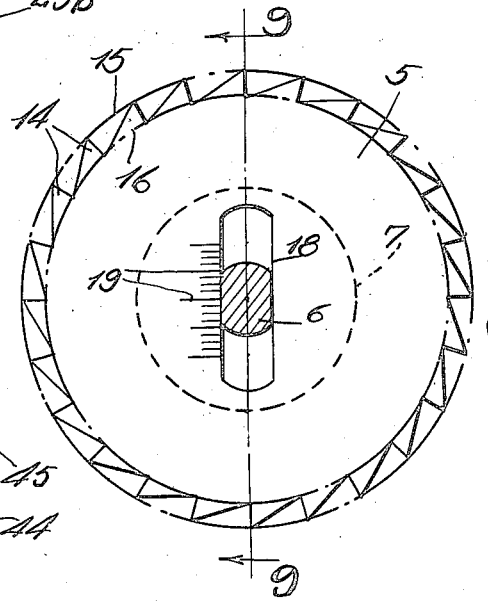
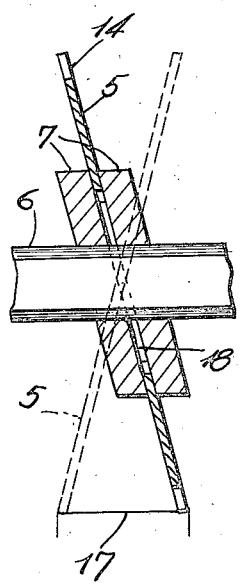
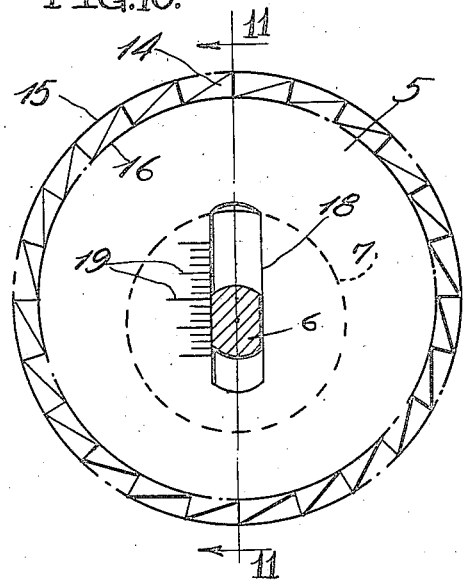
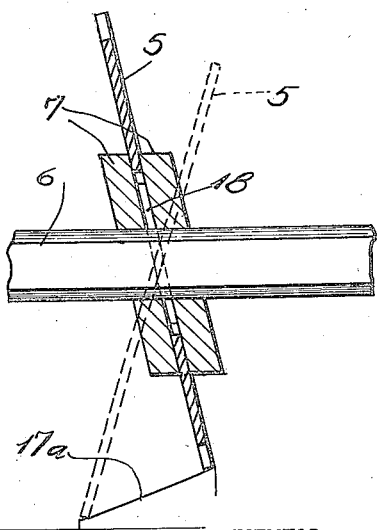
INVENTOR.
George Krasnosky
BY
Bryant & Lowry
ATTORNEYS

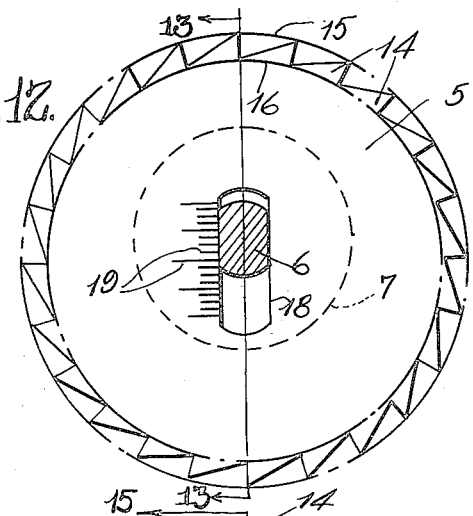
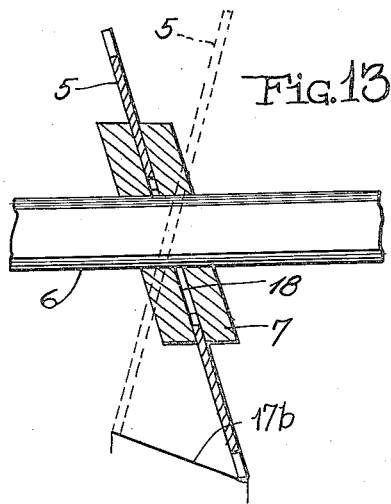
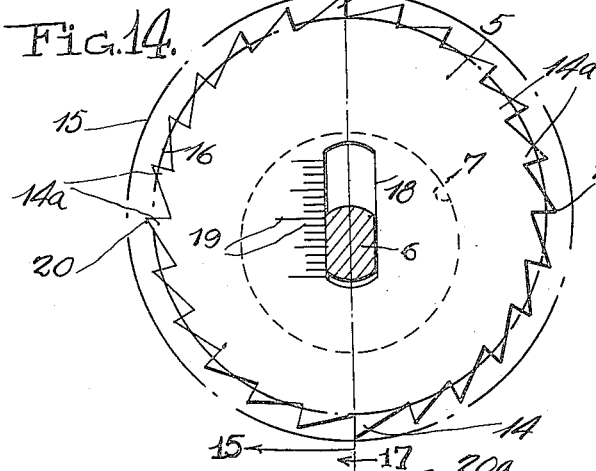
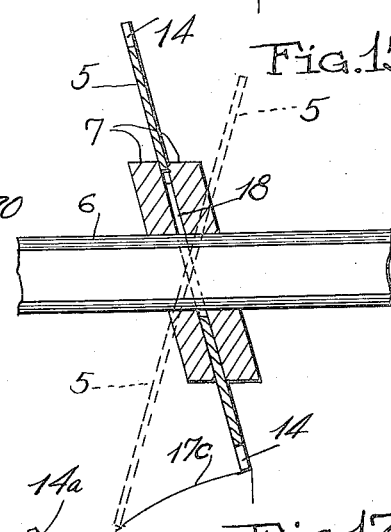
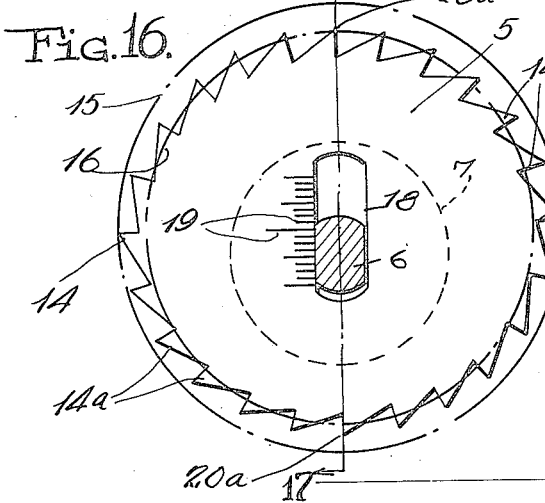
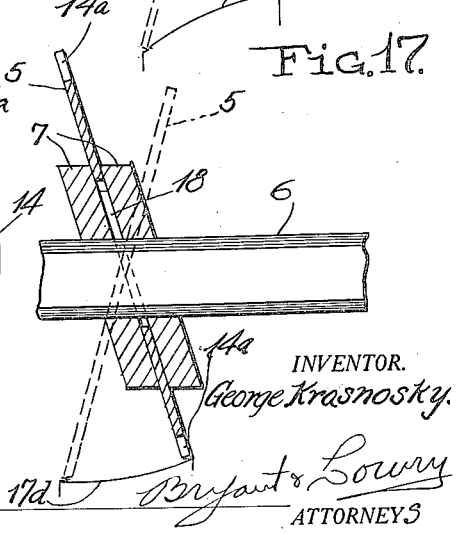

Patented Nov. 13, 1928.

1,691,850

UNITED STATES PATENT OFFICE.

GEORGE KRASNOSKY, OF PENSACOLA, FLORIDA.

WOODWORKING APPARATUS.

Application filed July 16, 1927. Serial No. 206,224.

This invention relates generally to woodworking apparatus, and has more particular reference to apparatus for shaping blank pieces or blocks of wood to form desired articles, and embodying a gang of rotary disk cutters or saws of different diameters mounted obliquely of and in spaced parallel relation upon a driving and support shaft, whereby the cutters are given a lateral wabbling movement when the shaft is turned, to make adjoining individual cuts into and laterally of the wooden blank and thereby produce the desired surface contour or profile of the article.
The primary object of the invention is to provide an apparatus of the above kind which is simple and durable in construction, and efficient and reliable in operation.

A further object is to mount certain of the cutters eccentrically of the supporting shaft for cutting individual surface portions of the article which are inclined or at an angle to the axis of the shaft.

Another object is to provide each of certain of the cutters with peripheral cutting teeth all projecting within a common circular cutting zone, but some of said teeth projecting further outwardly in said zone than others, whereby certain of the individual surface portions of the article are given any desired irregular or curved contour.

A still further object is to provide means for facilitating the eccentric mounting of the cutters on the supporting shaft.
Still another object is to provide an apparatus of the above kind including a series of gangs of cutters for successive use in imparting the several different surface contours of a wooden shoe bottom to a block of wood, whereby a completed shoe bottom may be readily and expeditiously formed.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a fragmentary side elevational view of an embodiment of the invention in a machine or apparatus unit for successively imparting the desired edge surface contour to a series of rectangular blocks to form shaped shoe bottom blanks;

Figure 2 is a vertical transverse section on line 2—2 of Figure 1;

Figure 3 is a vertical transverse section on line 3—3 of Figure 1;

Figure 4 is a front elevational view, partly in section, of an embodiment of the invention in a machine for imparting the desired bottom surface contour to the shaped shoe bottom blanks produced by the machine of Figure 1;

Figure 5 is a view similar to Figure 4, of an embodiment of the invention in a machine for imparting the desired upper surface contour to the partly completed shoe bottoms produced by the machines of Figures 1 and 4;

Figure 6 is a view similar to Figure 4, of an embodiment of the invention in a machine for turning porch columns or the like;

Figure 7 is an enlarged fragmentary section on line 7—7 of Figure 6;

Figure 8 is an exaggerated enlarged section on line 8—8 of Figure 4;

Figure 9 is a section on line 9—9 of Figure 8;

Figure 10 is a view similar to Figure 8 on line 10—10 of Figure 6;

Figure 11 is a section on line 11—11 of Figure 10;

Figures 12 and 13 are views similar to Figures 10 and 11, respectively, illustrating the manner of obtaining an inclined cut reverse to the inclination of cut produced by the saw mounting and adjustment of said latter figures;

Figure 14 is a view similar to Figure 10 taken on line 14—14 of Figure 4;

Figure 15 is a section on line 15—15 of Figure 14;

Figure 16 is a view similar to Figure 14 taken on line 16—16 of Figure 4; and

Figure 17 is a section on line 17—17 of Figure 16.

Referring more in detail to the drawings, each embodiment of the present invention includes a gang of rotary disk cutters or saws 5 of different diameters mounted obliquely and in spaced parallel relation upon a driving and supporting shaft 6, the saws or cutters being maintained in the desired oblique position and spaced relation by interposing spacing disks 7 therebetween, having oblique side spaces extending at the desired angle relative to the axes of the central openings in the spacing disks 7, through which the shaft 6 extends, for positioning the saws at the desired oblique angle relative to the shaft. The saws or cutters 5 are formed with central openings through which the driving and supporting shaft 6 extends, and these openings as well as the shaft 6 are of such shape as to effect a keying of the saws to the shaft 6 so as to be caused to rotate with the latter when driven. This keying action is preferably had by providing the shaft 6 with flat sides arranged to contact with similar flat surfaces of the walls of the saw openings as illustrated in Figures 8 to 17 inclusive.

Each embodiment of the invention further contemplates the provision of a fixed enlargement or collar 8 upon the shaft 6 near one end of the latter adapted to be abutted at its inner side by the adjacent end spacing disk 7 for the gang of cutters or saws, and a removable collar 9 on the other end portion of the shaft adapted to be tightened in engagement with the other end spacer 7 whereby the saws and spacers are held effectively in contiguous relation upon the shaft 6 so as to be incapable of play or movement relative to the latter when the saws are in proper assembled relation. In order to removably retain the collar 9 upon the shaft and to effect its movement to compact the spacers and cutters, the adjacent end portion of the shaft 6 is preferably threaded as at 10 and has a nut 11 removably threaded thereon in engagement with the under side of the removable collar 9. Further, in each instance, the shaft 6 is provided with a slightly reduced smooth outer end portion adapted to be journaled in suitable bearing brackets 12 carried by the frame of the machine whereby the shaft 6 is journaled in a horizontal position. At least one of the bearing brackets 12 for the shaft 6 is readily removable from the frame of the machine by being bolted to the latter as at 13, whereby the said bracket may be disengaged from the adjacent end of shaft 6 adjoining the threaded portion 12, for facilitating assembling and dis-assembling of the spacers and saws and for convenience in facilitating the replacement of one set of saws by another to accord with the shape and character of different articles to be produced.

To facilitate a clear understanding of the invention, attention is now directed to Figures 8 and 9 in which is shown a section of the shaft 6 with one of the saws 5 mounted obliquely thereon between a pair of adjacent spacer disks 7. In these figures the saw or cutter 5 is mounted concentrically of the shaft 6, and the saw is of circular form with all of its cutting teeth 14 lying similarly within a common circular cutting zone defined by concentric circles 15 and 16 respectively intersecting the points and faces of all of the teeth. Thus, when the shaft and saw are given one half revolution, said saw will wabble laterally so as to assume an opposite inclination as indicated by dotted lines in Figure 9, thereby making an individual cut into and laterally of the work along a straight line 17 parallel with the longitudinal axis of the shaft 6. With this fundamental principle as a basis, it will be evident that by adjusting the cutter or saw eccentrically of the shaft as illustrated in Figures 10 to 13 inclusive, the same straight cut will be had but the same will extend along an inclined line 17ª or 17ᵇ extending at an angle to the longitudinal axis of shaft 6, the direction of inclination of the line of cut depending upon whether or not the saw is adjusted eccentrically of the shaft in an upward or downward direction relative to the work. Assuming that the work is engaged with the under side of the saw, upward adjustment of the saw relative to the shaft 6 as indicated in Figures 10 and 11, the direction of inclination of the cut produced will be as indicated by the line 17ª of Figure 11, while an opposite inclination of cut will be produced as indicated by the line 17ᵇ in Figure 13 when downward adjustment of the saw is had eccentrically of the shaft as illustrated in Figures 12 and 13. It is further evident that the degree of inclination or the angle of the cut relative to the axis of the shaft will be in direct proportion to the degree of eccentricity at which the saw is adjusted relative to the shaft 6, the greater the degree of eccentricity, the greater the angle or inclination of the cut. To enable the eccentric adjustment of the saw to be conveniently had, the central opening of the latter is preferably in the form of an elongated slot 18 having flat sides engaging the flat sides of the shaft 6, and provided upon the adjacent surface of the saw along one side of the slot are suitable scale lines of indications 19 by means of accurate adjustment of the saw eccentrically of the shaft 6 may be effected to the desired degree or point. By successively adjusting the several saws and utilizing some extraneous means to temporarily support them in adjusted position until all of the saws have been adjusted which require eccentric adjustment, and then firmly clamping the saws and spacers together, the desired fixed relation of the saws to the shaft may be had. Naturally, the location or relative position of each individual saw relative to the other can be readily calculated as well as its necessary diameter ascertained.

The diameters of the several saws will accord generally with the shape or contour of the surface to be produced, and is calculated by a line extending in the direction of the shaft 6 and touching the uppermost or lowermost points of the saws, depending upon whether the work is engaged with the saws from below or above in the particular shaping operation.

An important feature of the present invention is involved in a manner of obtaining a lateral cut from a certain one or more of the saws, which is of curved form, whereby the curved surface portion of any particular article may be readily produced. In other words, the surface contour of such articles is of a curved form for at least a part of its length or extent, and in forming the surface contour of such an article at the desired point, it is necessary that the saws operative at these points be of such character as to produce a cut in a curved path, rather than in a straight path as discussed above and illustrated by the lines 17, 17$^a$ and 17$^b$. In order to produce this curved line of cut, I provide the proper saw or saws of a non-circular form by grinding or cutting certain of the teeth 14 further into the body of the saw as illustrated in Figures 14 and 16, so that the teeth of the saw will project outwardly in the cutting zone between the lines 15 and 16 to different distances, all of the teeth projecting to some extent outwardly into this zone to have a cutting effect. By this means, teeth at different points about the periphery of the cutter or saw may be formed to project outwardly to different points within the cutting zone for enabling any desired shape of cut to be produced, and this curved or irregular line of cut may be extended in a general direction parallel with the axis of the shaft 6 or in a general direction at an angle to said axis, by simply mounting the saw concentric with or eccentrically of the shaft 6, as the case may be. In the embodiments of the invention illustrated in Figures 14 to 16 inclusive, the general direction of the cut is at an angle to the axis of the shaft because of the eccentric adjustment of the cutter or saw relative to the shaft. To facilitate a clear understanding of this phase of the invention in the simplest manner possible, the form of saw required to produce a simple curved or arcuate cut is illustrated in Figures 14 to 17 inclusive. In Figures 14 and 15, the form of saw is such as to produce a line of cut which is curved inwardly or toward the shaft, and for this purpose, the teeth 14$^a$ are gradually cut or ground deeper into the body of the saw in opposite directions from diametrically opposed normal teeth 14 to diametrically opposed points 20 midway between the normal teeth 14, whereby the teeth gradually project greater distances outwardly into the cutting zone between the lines 15 and 16 from the points 20 to the normal teeth 14 in line with a diametric plane parallel with the length of the slot 18. With this construction, one half revolution of the saw will cause a cut which will curve inwardly as indicated by the line 17$^c$, due to the gradual receding of the points of the teeth from the lower normal tooth 14 to the points 20 at one side of the saw, and the subsequent gradual increase of projection of the teeth into the cutting zone from this point around to the highest normal cutting tooth 14. The similar formation of the teeth at the opposite half of the cutting edge of the saw is simply had to avoid a destructive cutting operation upon the next one half revolution of the saw when the latter returns to its normal position. Obviously, by mounting the saw eccentrically of the shaft, as shown, the curved cut is provided along an inclined line or in a general direction angular to the axis of the shaft, but by mounting the saw concentric with the shaft, the general line of cut will be parallel with the axis of the latter. It will be appreciated that by failing to grind or cut certain of the teeth at different points, in a predetermined manner, the line of cut may be given any desired irregular form. In producing an arcuate or curved cut which is curved outwardly or away from the shaft as indicated by the lines 17$^d$ in Figure 17, the same form of saw is provided as shown in Figures 14 and 15 and described above, except that the receeding of the cutting teeth start from normal diametrically opposed teeth 14 intersected by a plane extending at right angles to the longitudinal axis of the slots 18 in the saw, instead of parallel with the latter, the teeth which project outwardly to the least extent into the cutting zone being at opposed points 20$^a$ intermediate the normal teeth 14 and in line with opposite ends of the slot 18 instead of at opposite sides of the latter. The same change in formation of the teeth in this instance may be practiced as referred to above in connection with Figures 14 and 15 for enabling the production of any desired form of irregular cut instead of a curved or arcuate cut. In other words, by simply cutting certain of the teeth at different points, a greater or lesser distance into the body of the saw, instead of gradually cutting them deeper into the body of the saw from the teeth 14 to the points 20$^a$, such irregular line of cut may be had as generally mentioned above in connection with the form of saw shown in Figures 14 and 15.

As shown in Figures 1 to 5 inclusive, the present invention is particularly adapted and useful for embodiment in a series of machine structures or apparatus unit for effecting the uniform and rapid production of wooden bottoms for shoes, each produced from a rectangular block or blank of wood of suitable size, indicated at 21 in Figures 1 to 3 inclusive. The machine or apparatus unit illustrated in Figures 1 to 3 inclusive is employed for giving the desired edge surface contour or shape to the blocks 21 in the first steps of the process of producing the wooden shoe bottoms, and to this end, the blocks 21 are successively passed between and operated upon by a pair of cooperating gang of saws mounted and constructed in accordance with the present invention as explained above, one gang of saws being disposed in spaced relation to and directly above the other gang of saws with the required interval between the gang to produce a shoe bottom of the required size as to width. More specifically, this embodiment of the invention includes a suitable supporting frame 22 substantially in the nature of a table or bench having a horizontal top composed of a pair of spaced parallel sections 23 between which the horizontal beam 24 of the horizontally reciprocable work feeding and clamping carriage is slidably guided. This carriage includes a pair of opposed arms or uprights 25 and 26 which are rigid with and project upwardly from the ends of the beam 24, and carried by and projecting inwardly from the upper end of the arm 26 is a clamping jaw 27 opposed to an adjustable clamping jaw 28 carried by an adjusting screw 29 threaded through the upper end of the arm 26 and provided with an operating crank 30. As illustrated in Figure 1, a plurality of the blocks 21 are adapted to be placed in side by side contiguous relation so as to slidably rest at their lower edges upon the upper surfaces of the bench or table top sections 23 and to extend across the space between the latter as shown in Figure 3, the blocks 21 being clamped together between the jaws 27 and 28 for being slid along the top sections 23, past and between the gangs of saws for being operated upon by the latter when the carriage is shifted in the proper direction or to the right of Figure 1. The work feeding and clamping carriage further embodies legs 31 depending from the ends of the beam 24 and having anti-friction wheels 32 journaled upon their lower ends and riding upon a horizontal track 33 suitably supported below the top of the table or bench centrally between the sides of the latter.

Rotation may be imparted to the saw carrying shafts 6 by making the latter of sufficient length to project at one side of the frame as shown in Figure 2, suitable pulleys being provided upon these projecting ends of the shafts, about which a power transmission belt 34 passes, one of the shafts extending further than the other and being equipped with a further pulley 35 adapted to be belted to a suitable source of power or a motor. It will be noted in Figure 2 that each gang of saws in this embodiment of the invention is adapted to operate upon one side of the shoe bottom blank to produce the adjacent side surface contour for the shoe bottom, and as this contour is substantially in the nature of a continuous curve, all of the saws will be eccentrically mounted to a greater or lesser degree and of non-circular form as explained above in connection with Figures 14 to 17 inclusive. Moreover, the saws will vary in size or diameter in accordance with the points at which they are respectively located and the relative width of the shoe bottom at these points. Where the widths of the article or shoe bottom is rated, the diameter of the saws will be the smallest, and vice versa, as shown.

After the blocks of wood or shoe bottom blanks have been given the desired edge surface contour by means of the apparatus unit of Figures 1 to 3 inclusive, as described above, the next step in the process of manufacture of the shoe bottom is to impart the desired bottom surface contour to the blank as illustrated in Figure 4, so as to provide the continuously curved said surface of the saw, and the breast and tread surface of the heel. The apparatus unit for performing this step of the process consists of a suitable frame 22ª having a vertically adjustable top or platform 23ª above which is journaled a single gang of saws 5, the supporting and driving shaft 6 of which extends transversely of the frame and horizontally above the top 23ª as shown in Figure 4. In the use of this apparatus unit of Figure 4, the partly completed blanks produced by the apparatus unit of Figures 1 to 3 inclusive are fed successively upon the top 23ª beneath and past the gang of saws while the latter are rotated by application of power to the shaft thereof, a suitable driving pulley 35ª being provided upon a projecting end of said shaft for the latter purpose. The saws arranged to cut the continuously curved tread surface of the sole portion of the blank will involve the features illustrated in Figures 14 to 17 inclusive including the oblique and eccentric mounting of the saws as well as the non-circular form thereof, and the saws will also vary in diameter in accordance with the contour of the surface to be produced, as explained above in connection with the production of the edge contour of the blanks. The tread surface of the sole portion of the shoe bottom is indicated at 36, while the tread surface of the heel is indicated at 37, and it will be noted that the latter surface is perfectly flat and parallel with the shaft 6 of the saws. Naturally, the tread surface 37 is imparted to the heel by the use of circular saws mounted concentric with the shaft 6 as illustrated in Figures 8 and 9.

By adjusting the bench top or platform 23ª vertically, toward or away from the gang of saws, it will be evident that the device may be accommodated to blocks or blanks of different thicknesses.

After the bottom surface contour has been imparted to the blanks, they are operated upon by the apparatus unit of Figure 5 to impart the desired upper surface contour thereto. For this purpose, the unit of Figure 5 is similar to that of Figure 4 except that the table top or platform 23ª is omitted, and a suitable cover or casing 38 is provided for the gang of saws having a slot for opening 39 in the top wall thereof through which the uppermost portions of the saws project, said casing having a flat top wall for supporting the blanks, one at a time, in an inverted position and in engagement with the saws or the portions thereof projecting upwardly through the opening 28. As the upper surface contour of wooden shoe soles is of hollow or concaved form, the blanks are held stationary in this step of the process to produce the desired hollowed form of the blank in transverse section. Thus, by providing the saws of proper different diameters, the desired upper surface contour is imparted to the blanks having the required curvature both longitudinally and transversely, the larger saws being located at the points where the width of the blank is the greatest and the highest cuts are made. In this form of the invention, a pulley 35ᵇ may be provided upon the shaft 6 for facilitating rotation of the gang of saws. As the upper surface contour is substantially of continuously outwardly curved form, most of the saws will embody the eccentric mounting and non-circular contour of Figures 16 and 17, a few of the saws at the juncture of the sole and heel portions being of the reverse character as indicated in Figures 14 and 15. When the partly completed blanks have been operated upon by the unit of Figure 5, they are placed in the final form to constitute the completed article, except for possible smooth finishing by sand papering or the like. Obviously, by utilizing different gangs of saws in which the saws are varied as to diameter, facing, etc., the apparatus units may be adapted for operation upon different sizes of blanks for the ultimate production of different sizes of shoe bottoms.

While the present invention is particularly adapted for use in the manufacture of wooden shoe bottoms, it may obviously be employed for the production of various other wooden articles, and as illustrated in Figures 6 and 7, the invention may be embodied in a machine for turning wooden articles of irregular profile and circular cross-section, such as porch columns and the like. This form of the invention is quite similar to that of Figures 4 and 5 in that a single gang of saws is mounted horizontally at the top of a suitable frame 22ᵇ transversely of the latter, and a vertically adjustable work support 23ᵇ is provided beneath the gang of saws and slidably mounted in the frame, the shaft of the saws being provided with the driving pulley 35ᶜ. In this construction, the work support is provided with side opposed and horizontally aligned work centering points 40 and 41, one of which is adjustable outwardly in a manner well known in the wood turning art to permit the insert and removal of the work. Moreover, the center point 41 is provided upon a shaft suitably journaled upon the support 23ᵇ and equipped with a suitable hand operated gearing 42 for facilitating rotation of the work, whereby the desired article of predetermined contour may be produced upon rotation of the saws and upward feeding of the work to the latter. The profile of the article at any given point will readily determine the form and mounting of the saw to produce the contour surface of the article at such points, as will be readily apparent. In certain instances of the illustrated article produced, the saws will simply be of circular form and eccentrically mounted as illustrated in Figures 10 to 13 inclusive. At other points circular saws are employed mounted concentric with the shaft 6, and in other instances the saws will be concentrically mounted but of non-circular form in accordance with the theory illustrated in Figures 14 and 15. It is believed that this will be readily appreciated upon inspection of the form of the work when taken in connection with the explanation of the formation of the saws and the purposes of such formation as well as the purposes of the different arrangements of the saws relative to the shaft of the latter. As shown, the vertical adjustment of the work support 23ᵇ may be effected by journalling a vertical feed screw 43 in the lower part of the frame beneath the center of the work support 23ᵇ, and providing the latter with a depending rigid frame 44 in which is held and journaled a beveled gear 45 whose hub has threaded engagement with the screw 43, the gear 45 being engaged by a further beveled gear 46 carried upon the inner end of a horizontal hand operated shaft 47 also journaled in the frame 44. By manually rotating shaft 47, the gear 45 may be turned for feeding the latter and the frame 44 upwardly or downwardly and thereby raising and lowering the work support 23ᵇ and the work carried by the latter. The portion of the work support 23ᵇ in which the shafts of the gearing 42 are journaled may be vertically movable in a vertical elongated slot 48 of the frame 22ᵇ as indicated by dotted lines in Figure 6.

From the above description, it is believed that the construction, manner of use and operation of the several embodiments of the invention will be readily understood by those skilled in the art.

Minor changes may be made without departing from the spirit and scope of the invention as claimed.

What I claim as new is:—

1. In a woodworking apparatus, a rotatable driving and supporting shaft, a gang of disk cutters of different diameters mounted obliquely of and in spaced parallel relation upon said shaft to be driven by the latter, certain of said cutters further being of non-circular form, and embodying similar peripheral cutting teeth projecting outwardly for different distances into a circular cutting zone, concentric with the axes of the said certain cutters and defined by circular lines intersecting the inner and outer ends of the teeth which project outwardly for the greatest distance.

2. In a woodworking apparatus, a rotatable driving and supporting shaft, a gang of disk cutters of different diameters mounted obliquely of and in spaced parallel relation upon said shaft to be driven by the latter, and means to facilitate and permit selective independent adjustment of certain of said cutters eccentrically of said shaft.

3. An apparatus for making wooden shoe bottoms including a plurality of gangs of disk cutters, a certain pair of said gangs being adapted and arranged to impart the edge surface contour of the shoe bottoms to suitable blanks, another gang being adapted and arranged to thereafter impart the bottom surface contour to the shoe bottoms, and a remaining gang being adapted and arranged to finally impart the top concave surface contour to the shoe bottoms, each gang of cutters having a driving and supporting shaft and mounted obliquely relative to and in spaced parallel relation upon their shaft, certain of the cutters of each gang further being mounted eccentrically of their shaft.

4. An apparatus for making wooden shoe bottoms including a plurality of gangs of disk cutters, a certain pair of said gangs being adapted and arranged to impart the edge surface contour of the shoe bottom to suitable blanks, another gang being adapted and arranged to thereafter impart the bottom surface contour to the shoe bottoms, a remaining gang being adapted and arranged to finally impart the top concave surface contour to the shoe bottoms, each gang of cutters having a driving and supporting shaft and mounted obliquely relative to and in spaced parallel relation upon their shaft, certain of the cutters of each gang further being mounted eccentrically of their shaft, and means to feed a plurality of blanks between and past the first named pair of gangs.

5. An apparatus for making wooden shoe bottoms including a plurality of gangs of disks cutters, a certain pair of said gangs being adapted and arranged to impart the edge surface contour of the shoe bottom to suitable blanks, another gang being adapted and arranged to thereafter impart the bottom surface contour to the shoe bottoms, a remaining gang being adapted and arranged to finally impart the top concave surface contour to the shoe bottoms, each gang of cutters having a driving and supporting shaft and mounted obliquely relative to and in spaced parallel relation upon their shaft, certain of the cutters of each gang further being mounted eccentrically of their shaft, and means to support the inverted blanks one at a time upon said remaining gang.

In testimony whereof I affix my signature.

GEORGE KRASNOSKY.